US008679388B2

(12) United States Patent
Srebotnik et al.

(10) Patent No.: US 8,679,388 B2
(45) Date of Patent: Mar. 25, 2014

(54) METHOD FOR THE PRODUCTION OF LIGNOCELLULOSE-BASED PRODUCTS

(75) Inventors: Ewald Srebotnik, Vienna (AT); Thomas Kuncinger, Vienna (AT); Martin Steinwender, Perchtoldsdorf (AT)

(73) Assignee: Fritz Egger GmbH & Co., Unterradlberg (AT)

( * ) Notice: Subject to any disclaimer, the term of this patent is extended or adjusted under 35 U.S.C. 154(b) by 2132 days.

(21) Appl. No.: 10/571,301

(22) PCT Filed: Sep. 13, 2004

(86) PCT No.: PCT/EP2004/010210
§ 371 (c)(1),
(2), (4) Date: Jan. 24, 2007

(87) PCT Pub. No.: WO2005/028561
PCT Pub. Date: Mar. 31, 2005

(65) Prior Publication Data
US 2008/0115899 A1 May 22, 2008

(30) Foreign Application Priority Data
Sep. 13, 2003 (DE) .................................. 103 42 347

(51) Int. Cl.
*C08L 97/02* (2006.01)
(52) U.S. Cl.
USPC ........................................................ 264/128
(58) Field of Classification Search
USPC ........................................................ 264/128
See application file for complete search history.

(56) References Cited

U.S. PATENT DOCUMENTS

2003/0165669 A1* 9/2003 Nowak et al. ................. 428/212

FOREIGN PATENT DOCUMENTS

WO    WO 9816357    4/1998
WO    WO 99/36465    7/1999

OTHER PUBLICATIONS

Chandra et al. "Evaluating Laccase-Facilated Coupling of Phenolic Acids to High-Yield Kraft Pulps", IPST Technical Paper Series No. 897, May 2001.*

* cited by examiner

Primary Examiner — Larry Thrower
Assistant Examiner — Xue Liu
(74) Attorney, Agent, or Firm — Proskauer Rose LLP

(57) ABSTRACT

The invention relates to a method for the production of a lignocellulose product from a) at least one material containing lignocellulose, b) a resin-based binding agent and (c) an organic compound comprising at least one first and second functional group. The first functional group is an oxidizable functional group and the second functional group is a group which can react with the binding agent forming a substantially covalent bond. The reactand and reaction conditions of the method are selected in such a way that substantially covalent cross-polymerization occurs between the material containing lignocellulose and the binding agent. The lignocellulose products produced according to the inventive method contain less binding agent and have improved physical-chemical properties.

31 Claims, 6 Drawing Sheets

METHOD FOR THE PRODUCTION OF LIGNOCELLULOSE-BASED PRODUCTS

BACKGROUND OF THE INVENTION

The invention relates to a method for the production of lignocellulose-based products by modifying lignocellulosic material (for example wood). The invention also relates to products which are produced by this method, for example composite materials.

Various methods for enzymatic modification of lignocellulosic material are known from the prior art. Thus EP 0772 717 B1 discloses a method for treating lignocellulosic material and a phenolic polysaccharide with an enzyme which is capable of catalysing the oxidation of the phenol groups in the presence of an oxidising agent. The phenolic polysaccharide comprises substituents which contain phenolic hydroxyl groups. In this case the phenolic polysaccharide is added to the lignocellulosic material and does not, for instance, form an original constituent of the lignocellulosic material. Thus a method for enzymatic coupling of additives (preferably phenols of any sort) is described in this document, with the additives functioning separately as binders. The additive thus replaces conventional binders, such as aminoplasts, phenoplasts, isocyanates, polyvinyl acetates, epoxy resins or acrylic resins.

DE 36 21 218 A1 describes a method for producing a binder for wood- or cellulose-containing materials by using lignin compounds where the lignin compounds are mixed with exopolysaccharides. The exopolysaccharides are obtained in a separate method step by microorganisms in suitable nutrient media (culture fluids). What is involved here is a binder produced by enzymatic reactions which is then added to the wood- or cellulose-containing materials (substrate). The document does not describe an enzymatic and/or chemical reaction between the substrate and the binder.

DE 43 31 878 A1 and WO 99/31155 describe methods for producing polymers which contain lignin and organic compounds and polymers produced by the methods where the organic compounds comprise at least three carbon atoms. The lignin used as the initial material can be natural plant lignin, obtained from wood for example, but in particular sulphite lignin or alkali lignin (kraft lignin) as occurs in large quantities with chemical pulping for industrial production of cellulose. Peroxidases (for example manganese peroxidase) and phenol oxidases (for example laccases, tyrosinases) can be used as the radically oxidising enzymes, which together with oxidising agents, such as hydrogen peroxide or oxygen, induce polymerisation. WO 99/31155 cites numerous applications for the polymer obtained, inter alia the use of polymers of this type to cure wood materials. These documents do not disclose an enzymatic and/or chemical reaction between wood material and polymer (binder).

U.S. Pat. No. 6,187,136 B1 describes a method for producing modified lignin by enzymatic coupling of phenols to lignin. Fundamental to the method described is that the phenols carry positively or negatively charged functional groups, so an ionic interaction of oppositely charged functional groups takes place. In other words, a covalent bond between enzymatically applied additive and the binder is not sought. The described method allows improvement to the binding properties in the course of paper production when using a charged binder, such as cationic starch and negatively charged lignocellulose. The particular drawback of the method is that conventional binders, as are used for example for the production of wood materials, cannot be used.

SUMMARY OF THE INVENTION

An object of the present invention is to provide a method for the production of lignocellulose-based products by modification of lignocellulose-containing material, in which method the drawbacks of the methods known from the prior art are avoided. In particular the method should allow production of wooden composite materials with reduced binder content and with improved physical-chemical properties.

This object is achieved according to a first embodiment of the invention by a method for producing a lignocellulose-based product from at least (a) one lignocellulose-containing material, (b) a resin-based binder and (c) an organic compound which comprises at least one first and one second functional group, wherein the first functional group is an oxidisable functional group and the second functional group is a group which is capable of reacting with the binder to form a substantially covalent bond, wherein the method comprises:

treating the lignocellulose-containing material with the organic compound in the presence of an oxidising agent, wherein the treatment takes place in a medium and under reaction conditions such that the first functional group of the organic compound is oxidised, whereby at least one oxidation product of the organic compound is produced which, with the lignocellulose-containing material, enters a substantially covalent bond, treating the reaction product from lignocellulose-containing material and organic compound with the binder, wherein the treatment takes place in a medium and under reaction conditions such that the second functional group of the organic compound or a derivative thereof formed in the course of treatment, with the binder, enters a substantially covalent bond and curing the composite material thus produced.

According to a second embodiment of the invention the above-described object is also achieved by a method for producing a lignocellulose-based product from at least (a) one lignocellulose-containing material, (b) a resin-based binder and (c) an organic compound which comprises at least one first and one second functional group, wherein the first functional group is an oxidisable functional group and the second functional group is a group which is capable of reacting with the binder to form a substantially covalent bond, wherein the method comprises:

reacting the binder with the organic compound, wherein the reaction takes place in a medium and under reaction conditions such that the second functional group of the organic compound or a derivative thereof formed in the course of treatment, with the binder, enters a substantially covalent bond;

treating the lignocellulose-containing material with the reaction product of binder and organic compound in the presence of an oxidising agent, wherein the treatment takes place in a medium and under reaction conditions such that the first functional group of the organic compound is oxidised, whereby at least one oxidation product of the organic compound is produced which, with the lignocellulose-containing material, enters a substantially covalent bond and curing the composite material thus produced.

One advantage of the method according to the invention is that conventional binders, as are used for example in the wood industry, can be used. These are, for example, aminoplasts (for example urea-formaldehyde resin, melamine-formaldehyde resin), phenoplasts (for example phenol-formaldehyde resin) and vinyl acetate (for example PVAc or casein glue). In the course of the curing reaction these binders do not form a covalent bond with the lignocellulosic material to be glued. There exists a purely physical anchoring of the binder in the material in that the binder penetrates into the material and as a result of curing brings about positive coupling between two material surfaces.

A further advantage of the method according to the invention compared with known methods lies in the increase in the binding force between lignocellulose and binder owing to the formation of substantially covalent bonds. This advantage can be used to produce composite materials with improved chemical-physical properties and/or to reduce the conventionally used quantities of binder while retaining predetermined chemical-physical properties.

Products produced by the method according to the invention are, for example, wooden composite materials, in particular chipboards, fibreboards, plywood, oriented strand board (OSB) and moulded composite materials. However, other lignocellulose-containing products can also be produced by the described method. The products produced by the method according to the invention have improved physical-chemical properties.

According to one aspect of the present invention oxidisable aromatic compounds, such as phenols or aromatic amines, are preferably used as the functional organic compounds. Phenols and amines can be easily oxidised by oxidising agents, such as oxygen or hydrogen peroxide, in the presence of a suitable catalyst. Oxidative enzymes, such as laccases or peroxidases, are preferably used as the catalysts in the method according to the invention, wherein preferably radical intermediates are produced although other reactive intermediates are also possible. If the reaction takes place in the presence of lignocellulose these radical intermediates can react with suitable structures, preferably derived from lignin, in the lignocellulose and couple thereto, the term "coupling" being taken to mean the formation of a covalent bond between the oxidation intermediate of the functional organic compound and the lignocellulose. The structures derived from lignin can be native lignin structures and/or lignin radicals produced in the course of the effect of the enzyme which couple to the oxidation intermediates of the functional organic compound. Even though radical reactions are preferred, coupling can also take place by other mechanisms, such as substitution, which lie within the scope of the invention as long as at least one of the reaction components involved is an oxidation product of the original functional organic compound.

DESCRIPTION OF THE INVENTION

The invention is accordingly based on the recognition that composite materials based on lignocellulose and which contain a binder, for example formaldehyde/urea resin, have improved physical-chemical properties or identical physical-chemical properties with a smaller quantity of binder.

Physical-chemical properties are, by way of example, taken to mean the following properties: thickness swell with the action of cold or hot water, bending strength, module of elasticity, transverse tensile strength (tensile strength perpendicular to the plane of the board or binder joint), tensile strength (parallel to the plane of the board or binder joint), shear strength of the binder joint and formaldehyde content (with formaldehyde-containing binder) These advantages are achieved if the binder is substantially covalently crosslinked with the lignocellulose in the course of production of the composite material. In the method according to the invention this can be achieved by the use of an above-described functional organic compound which additionally comprises one or more functional groups, for example an amine decoupled from the aromate, which are capable of forming a substantially covalent bond with the binder.

According to a preferred embodiment of the invention the method of the invention comprises the following method steps: oxidising a functional organic compound in the presence of lignocellulose with an oxidising agent, so the functional organic compound is coupled substantially covalently to the lignocellulose, followed by a reaction of the coupled functional organic compound with a suitable binder under conditions which cause a substantially covalent bond between the coupled functional organic compound and the binder. These reactions can also take place in reverse order or simultaneously.

FIG. 1 shows a block diagram of an exemplary method sequence. Lignocellulose is loaded with an enzyme (laccase in this case), functional organic compounds and auxiliaries. Modification of the lignocellulose takes place by a covalent coupling of the functional compound thereto. The added binder itself is then substantially covalently coupled to the modified lignocellulose, reacts chemically or physically with itself (in this case designated "pressing" for the sake of simplicity) and imparts specific physical-chemical properties to the resultant end product.

FIGS. 2 and 3 show an explanatory, non-limiting example for this purpose, for example for formaldehyde resins, suitable compound 4-hydroxy-3-methoxybenzylamine (HMBA) is cited. Without committing to a specific theory in this case, the substantially covalent bond of HMBA as a functional organic compound to lignocellulose takes place by the above-described oxidation reaction (see FIG. 2), followed by electrophilic attack of a binder component (for example formaldehyde or pre-condensed formaldehyde) on the free amino group of the HMBA coupled to the lignocellulose to form a covalent bond, so ultimately substantially covalent crosslinking between lignocellulose and binder is achieved (see FIG. 3). Further reaction steps, such as separation of water, may follow to stabilise the bond further.

Any desired functional organic compounds and binders can be used for the substantially covalent coupling achieved by the method according to the invention between functional organic compound and binder, as long as the chosen functional organic compound is capable, with the aid of the above-mentioned oxidising agent and catalysts, of coupling on the one hand to lignocellulose and on the other hand to a suitable component of the chosen binder, so crosslinking between lignocellulose and binder is achieved. Accordingly in a particular case of formaldehyde/urea resins the urea components can also be the suitable component of the binder if the chosen functional organic compound contains a suitable aldehyde group for example.

In one of the embodiments of the invention, the functional group of the functional organic compound provided for covalent coupling to the binder, for example the amino group in the case of HMBA, is preferably unchanged in the course of the above-described oxidation reaction or is changed only to the extent that the derivate formed is still capable of coupling to the binder. In a further embodiment of the invention this functional group is selected such that its coupling to the binder is only made possible by a derivation of this sort. This derivation can be directly associated with the oxidation reaction or take place only under the reaction conditions for the binder.

The preferred components of the method according to the invention described hereinafter apply to all embodiments of the invention.

The lignocellulose-containing materials used in the method according to the invention can for example be plant fibres, wood fibres, wood chips, flakes and/or wood veneers.

Examples of resin-containing binders that can be used in the method according to the invention are aminoplasts, phenoplasts, vinyl acetates, isocyanates, epoxy resins and/or acrylic resins. Particularly preferred resin-containing binders are urea-formaldehyde resin, melamine-formaldehyde resin, phenol-formaldehyde resin, polyvinyl acetate and/or casein glue.

The binder used in the method according to the invention can also contain a curing agent. Alternatively, curing can also take place by pressing the composite material under the effect of heat.

The quantity of binder used in the method according to the invention is preferably 0.01 to 15% by weight, in particular 0.1 to 10% by weight, even more preferably 0.5 to 7.5% by weight, based on the dry weight of the lignocellulose-containing material used.

Examples of organic compounds that can be used in the method according to the invention are aliphatic or heterocyclic compounds with 3 to 15 carbon atoms and/or an aromatic compound with 6 to 20 carbon atoms.

The organic compounds that can be used in the method according to the invention comprise at least one first and one second functional group. The functional groups are preferably, independently of each other, an oxygen-containing or nitrogen-containing group and/or a group containing a multiple bond.

The first oxidisable functional group is preferably a hydroxyl, aromatic hydroxyl, hydroxylamino, carbonyl, amine, imine, amide, nitrile, isonitrile, azo, alkene or alkyne group.

According to a further preferred embodiment of the invention the first oxidisable group is produced in the course of a chemical reaction under the reaction conditions of the first and/or second method step from a precursor thereof which is selected from the group comprising hydroxyl, aromatic hydroxyl, carbonyl, amine, imine, nitrile, isonitrile, azo, alkene and alkyne groups.

The second functional group is preferably a hydroxyl, aromatic hydroxyl, carbonyl, carboxyl, amine, imine, amide, ureide, N-substituted ureide, urea, N-substituted urea, urethane, N-substituted urethane, nitrite, isonitrile, azo, alkene or alkyne group.

According to a further preferred embodiment of the invention the second functional group is produced in the course of a chemical reaction under the reaction conditions of the first and/or second method step from a precursor thereof which is selected from the group comprising hydroxyl, aromatic hydroxyl, carbonyl, carboxyl, amine, imine, amide, ureide, N-substituted ureide, urea, N-substituted urea, urethane, N-substituted urethane, nitrile, isonitrile, azo, alkene and alkyne groups.

An aromatic compound is preferably used as the organic compound in which the second functional group is decoupled from the aromate by an aliphatic side chain. Further examples of organic compounds that can be used in the method according to the invention are phenolic compounds and/or aromatic amines. A particularly preferred organic compound is 4-hydroxy-3-methoxybenzylamine (HMBA).

The organic compound is preferably used in the method according to the invention in a quantity of 0.01 to 200 mol %, in particular 0.1 to 100 mol %, based on the quantity of binder used.

Any desired oxidising agents which are capable of oxidising the first functional group of the organic compound can be used as the oxidising agent in the method according to the invention. The first functional group of the organic compound is preferably oxidised by enzymatic oxidation. Particularly suitable oxidising agents are oxygen and/or hydrogen peroxide, preferably in combination with a catalyst, in particular with enzymes as the catalyst. Suitable enzymes are for example oxidases and peroxidases.

According to a further preferred embodiment of the invention oxygen is used as the oxidising agent. An enzyme from the group comprising oxidases, in particular laccases (EC 1.10.3.2), catecholoxidases (EC 1.10.3.1, EC 1.10.3.4 and EC 1.10.3.5), peroxidases, (in particular EC 1.11.1.7, EC 1.11.1.13 and EC 1.11.1.14) and bilirubin oxidases (EC 1.3.3.5) is preferably selected as the catalyst.

A particularly preferred enzyme is laccase. When using laccase the reaction medium can optionally be aerated during treatment. According to a further preferred embodiment a peroxidase is used as the enzyme and hydrogen peroxide is used as the oxidising agent. The initial concentration of the hydrogen peroxide in the medium is preferably 0.01 to 100 mM.

The quantity of enzyme used in the method according to the invention is preferably 0.01 to 1,000 enzyme units, in particular 0.01 to 50 enzyme units, per g dry lignocellulose-containing material.

Treatment of the lignocellulose-containing material can be carried out under any desired conditions as long as the desired reaction is achieved. It has proven to be particularly advantageous if, in the presence of the oxidising agent, the medium has a temperature of 10 to 120° C., in particular 15 to 90° C., and/or a pH of 2 to 10, in particular 4 to 9. The reaction medium can be an aqueous and/or organic solvent. Monohydric and/or polyhydric alkanols and/or ketones, such as ethanol, glycol and/or acetone, or mixtures thereof, are preferably used as the solvent.

According to a further preferred embodiment of the invention the reaction product of lignocellulose-containing material and organic compound, the composite material and/or the lignocellulose-based product is dried in a further method step.

Finally, the invention also relates to a lignocellulose-based product which is obtainable by the method according to the invention.

The invention will be described in more detail hereinafter with the aid of embodiments and with reference to the accompanying figures. The examples serve to illustrate the invention and do not restrict the scope of the invention. In the figures.

Examples 1 to 3 analytically demonstrate covalent coupling of a selected functional organic compound according to the invention to lignin or lignocellulose by using the oxidising agent laccase and the covalent bond of the HMBA coupled to lignocellulose to a binder. Examples 4 and 5 demonstrate an exemplary method for treatment according to the invention of chip material and show the advantages with respect to the improvement in the chemical-physical properties with the aid of tested lab panels.

EXAMPLE 1

Radiolabelled HMBA was synthesised as described by Kaga et al (J. Org. Chem. 54, 3477 to 3478 (1989)) by using a-14C-vanillin (ARC, St. Louis, Mo., U.S.A.) and ammonium formiate. The reaction product 14C-HMBA was purified by means of DC and the radiochemical purity by means of HPLC was >95%. The correct chemical structure of the synthesised HMBA was confirmed by means of IH- and 13C-NMR. It should be mentioned that the 14C labelling was used merely to facilitate the quantitative analytical detection of HMBA and its reaction products. As is known to experts in the field of the invention, radioactive labelling with 14C does not have any significant influence on the chemical reaction behaviour of a compound, such as HMBA. 8.0 mg/ml water-insoluble milled wood lignin (MWL, produced from Loblolly pine) was treated with a mixture of 0.5 U/ml laccase (see Example 4) and 1 mM (27 nCi/ml) 14C-HMBA at pH 5.0 for two hours at 40° C. A control test as described above was simultaneously carried out but without laccase being applied. After the treatment the reaction mixture was centrifuged, the aqueous phase removed and an aliquot thereof fractionated to determine the molecular weight distribution via a gel filtration column (Sephadex LH20 in DMF/0.095 M LiCl). The MWL pellet was washed by repeated suspension in water and centrifuging, dissolved in DMF (dimethylformamide) and, likewise as described above, fractionated by means of gel filtration. The radioactivity in the eluate fractions of the gel filtrations and in the purified washing water was measured after adding a scintillator with a liquid scintillation counter.

The results are shown in Table 1. Table 1 shows the weight assessment for 14C-HMBA. The results document that laccase was capable of binding 14C-HMBA to MWL (50.7% yield), while no significant bond could be observed without laccase (3.2%). The recovery was almost 100% in both cases.

Figure 1:
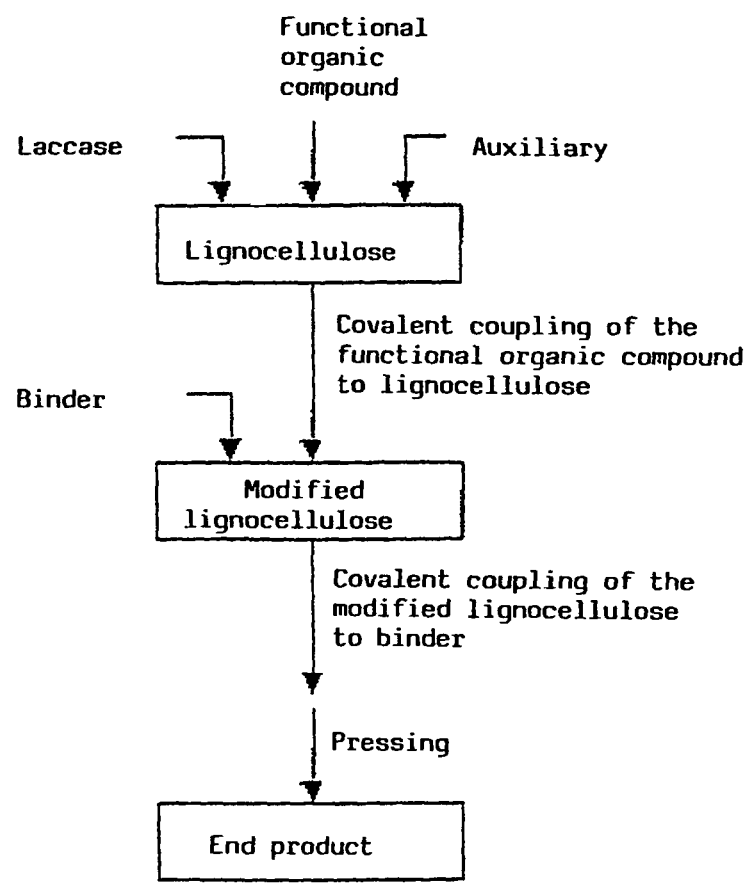
FIGS. 1 to 3 show reaction diagrams to illustrate preferred embodiments of the method according to the invention.
Figure 2:
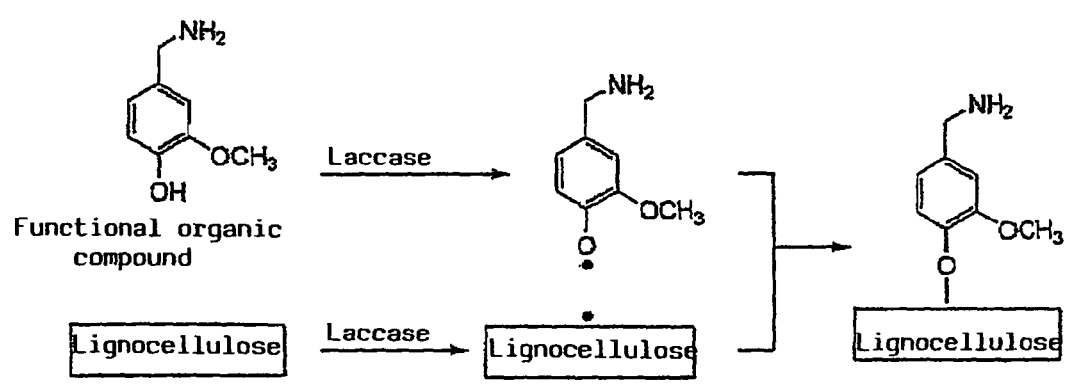
Figure 3:
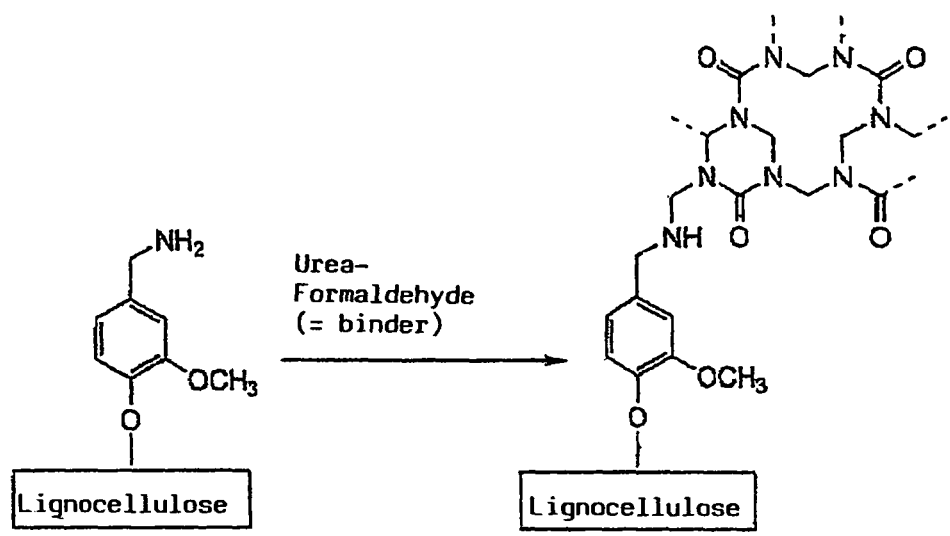
Figure 4:
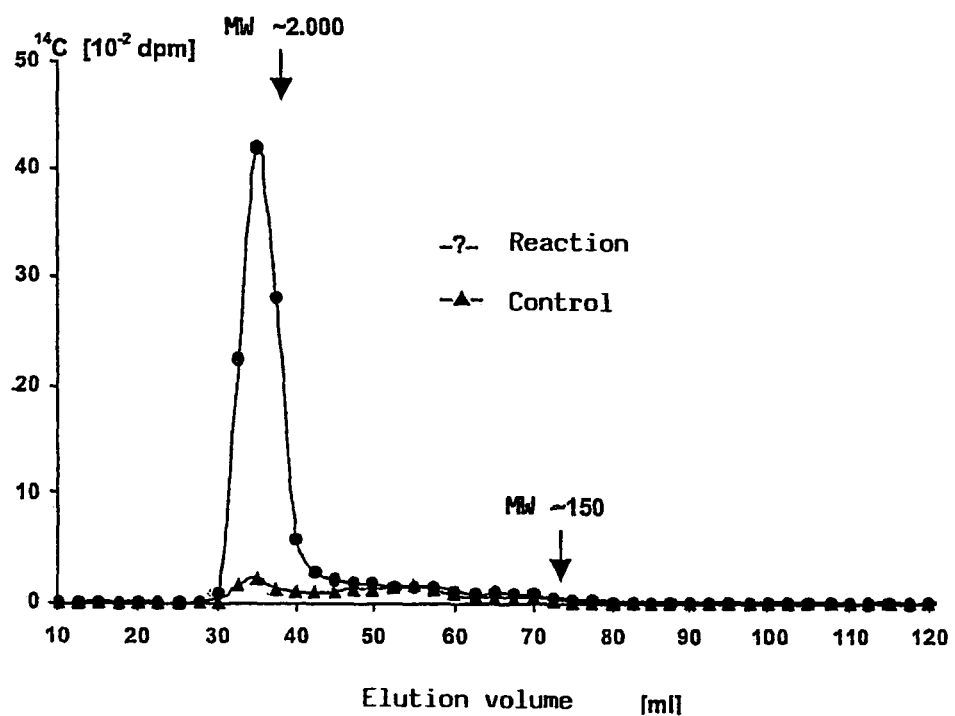
FIG. 4 shows molecular weight analyses of a reaction to couple 14C-HMBA to milled wood lignin (MWL) by means of laccase (reaction) and the corresponding control reaction without laccase (control)

FIG. 4 shows the corresponding gel filtration chromatogram of the MWL dissolved in DMF. The 14C molecular weight distribution coincides with the molecular weight distribution of the MWL used, determined by means of UV absorption (UV chromatogram not shown) with a mean molecular weight of about 2,000. There was no significant radioactivity in low molecular fractions (for example at a molecular weight of 150, the approximate position of the unbound 14C-HMBA). Only low amounts of radioactivity could be determined in the control reaction. The result shows that laccase caused a strong, possibly covalent, bond of 14C-HMBA to MWL.

A further control test—the reaction of 14C-HMBA with laccase in the absence of MWL—demonstrated that while 14C-HMBA was reacted by the laccase, the reaction products remained soluble in water and therefore could not be precipitated by centrifuging. This is further evidence of the fact that in the complete reaction mixture a covalent bond did actually take place between 14-HMBA and MWL.

EXAMPLE 2

Spruce wood chips (0.2 to 2 mm) were treated with 14C-HMBA and laccase at pH 5.0 at 30° C. After treatment the aqueous phase was removed from the reaction mixture and the radioactivity contained in an aliquot thereof measured using a liquid scintillation counter. The bound quantity of HMBA was calculated from the radioactivity used minus the radioactivity remaining in the aqueous phase after treatment. As illustrated in Table 2, the binding yield herein was 46 to 96% of the HMBA used, depending on the reaction conditions. In control tests without laccase no significant bond of 14C-HMBA to chips could be detected (3%). The highest binding yield (97%) was obtained under the following reaction conditions: moisture content 200% (ratio liquid/solid=2:1), based on dry mass of chip material; 0.2 U laccase and 6 mg HMBA per gram dry mass; pH=5.0 by means of 5 mM acetate buffer; reaction time 8 hours at 30° C. Contrary to our expectations, the enzymatic binding reaction was not inhibited by high HMBA concentrations up to 40 mM in the aqueous phase of the reaction mixture. Consequently the method could be integrated into the production process without the moisture content of the wood chips being significantly increased.

The treated chips from the batch with a binding yield of 97% were repeatedly washed with water to remove unbound 14C-HMBA not adhering to the chips. Two extra reactions with DMF followed, whereby overall a maximum of 5 to 6% of the bound radioactivity of the chips could be liberated. This proves that HMBA was very strongly, most likely covalently, bonded to the chips.

EXAMPLE 3

Spruce wood chips (0.2 to 2 mm) were treated with 6 mg 14C-HMBA and 2 U laccase per gram chips at pHs of 3 to 8 for 2 to 24 hours in suspension (ratio liquid/solid=20:1). An aliquot of the aqueous phase was removed from the reaction mixture during and/or after treatment and the radioactivity contained therein was measured using a liquid scintillation counter. The bound quantity of HMBA was calculated from the radioactivity used minus the radioactivity remaining after treatment in the aqueous phase.

Figure 5:
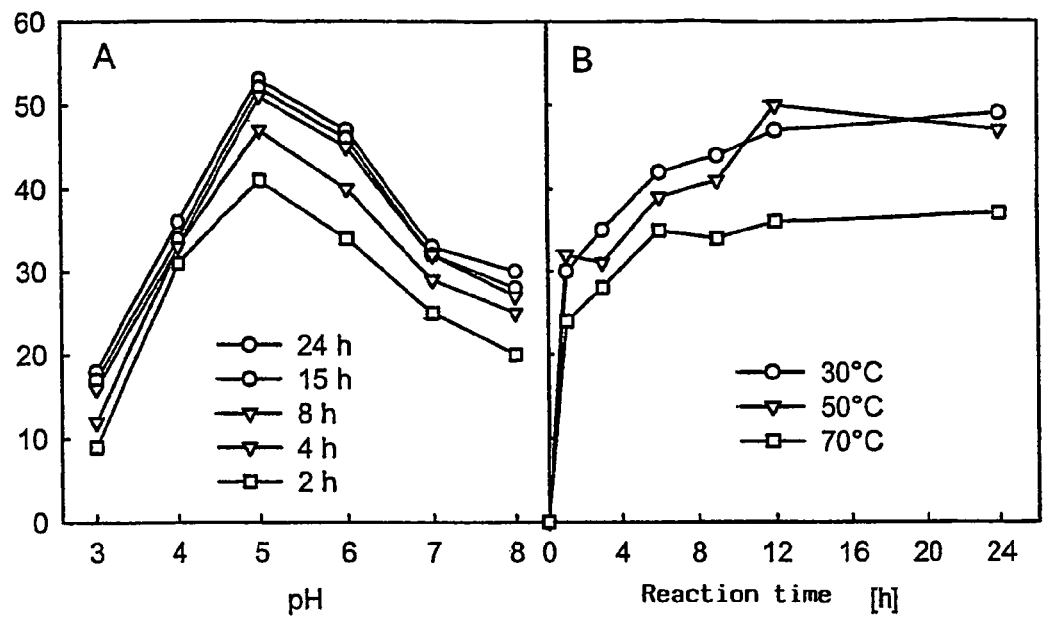
FIG. 5 shows determination of the temperature and pH optima for coupling of 14C-HMBA to spruce wood chips by means of laccase.

As shown in FIG. 5 the temperature range for the highest binding yields was between 30° C. and 50° C. (FIG. 5B) and the pH optimum was 5.0 (FIG. 5A). However, the use of a buffer proved to be unnecessary as at pH 7.0 water delivered the same results, owing to the acidity of wood, as a buffer at pH 5.0.

EXAMPLE 4

15N-labelled HMBA was synthesised as described by Kaga et al (J. Org. Chem. 54, 3477 to 3478 (1989)) by using 15N ammonium formiate. 15N ammonium formiate was produced from 15N ammonia and formic acid. The correct chemical structure of the synthesised HMBA was confirmed by means of IH- and 13C-NMR. It should be mentioned that the 15N labelling was used merely to facilitate the analytical detection of HMBA and its reaction products by means of nuclear magnetic resonance spectroscopy (NMR). As is known to experts in the field of the invention, labelling with 15N does not have any significant influence on the chemical reaction behaviour of a compound, such as HMBA.

Spruce wood chips (0.2 to 2 mm) were treated at a moisture content of 200%, based on dry mass chip material, with 0.2 U laccase and 6 mg 15N HMBA per gram dry mass at pH=5.0 in 5 mM acetate buffer and a reaction time of 8 hours at 30° C. The treated chips were repeatedly washed with water and then dried at 80° C.

Figure 6:
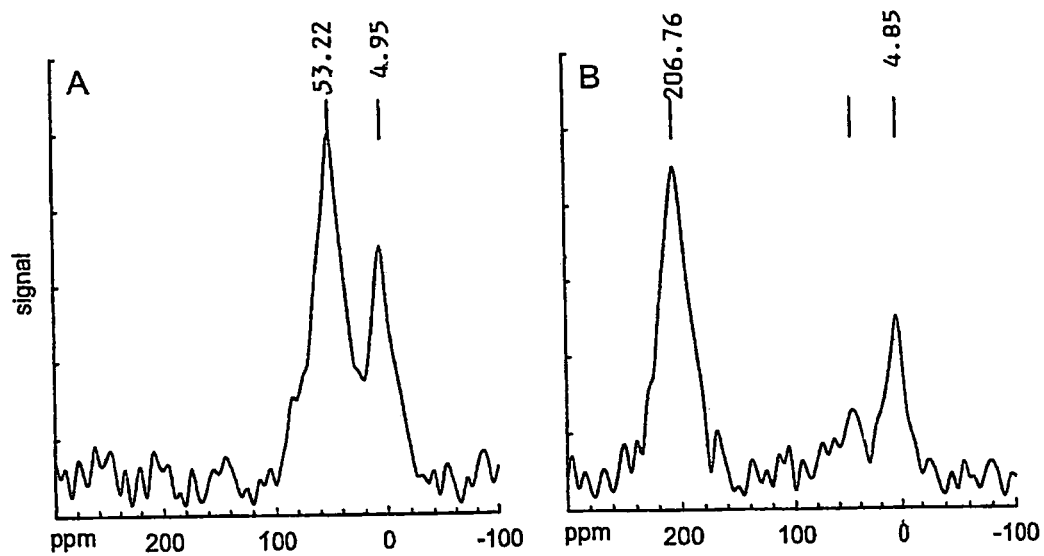
FIG. 6 shows 15N-NMR spectra of spruce wood chips treated with laccase and 15N-HMBA before (A) and after (B) gluing with urea-formaldehyde resin.

FIG. 6A shows the 15N-NMR spectrum of the spruce wood chips treated with laccase and 15N-HMBA. Clear 15N signals can be seen at approx. 208 and approx. 5 ppm, and this corresponds with the chemical displacement of a free (R—$NH_2$) or protonated (R—$NH_3^+$) primary amino group. No further 15N signals could be detected, so this proves that the amino group of HMBA remains intact in the course of coupling to the chips. FIG. 6B shows the 15N-NMR spectrum of spruce wood chips which, as described in Example 1, were treated with laccase and HMBA and then in a manner similar to that described in Example 5 were glued with formaldehyde-urea resin (5% solid resin). Compared with FIG. 6A the 15N signals are significantly reduced at approx. 208 and approx. 5 ppm and a new 15N signal can be seen at approx. 208 ppm, and this corresponds to the chemical displacement of a secondary amino group (R—NH—R'), so this proves that the HBMA coupled to the chips reacted with the resin chemically and most likely by forming a covalent bond with the formaldehyde components of the resin.

EXAMPLE 5

Conventional moist chip material, as is used for the production of chipboards for the intermediate layer, was sprayed with a laccase HMBA water mixture (100 U laccase (EC 1.10.3.2) of *Trametes versicolor* per liter mixture, with 1 U corresponding to a reaction rate of 1 μmol/min at pH 5.0 with respect to the laccase standard substrate ABTS; 0.01 mol HBMA per liter mixture), so ultimate moisture of the chip material of 150%, based on the dry mass, was established. After about 1 hour reaction time, drying at about 70° C. took place in a circulating air drying oven to an ultimate moisture of 3%, based on the dry mass. The drying time was about 72 hours. The dry chip material was then mixed with a commercially available urea-formaldehyde resin of the formaldehyde emission class E1 and corresponding commercially available curing agent on an ammonium-nitrate basis. Two batches of panels were produced, one with a binder content of 5% solid resin, based on dry chip mass, and the other with a binder content of 10%.

The chips thus produced were scattered batchwise to form chip cakes and 14 mm thick panels were produced on a lab press under the action of pressure and a temperature of about 180° C. A press factor of 7.8 seconds/mm was calculated from the required pressing time. The results of the mechanical-chemical testing are shown in Table 3.

EXAMPLE 6

As a reference to the panels mentioned in Example 5, panels were produced from untreated chip material. To compensate a potential effect of the chip moisture, before drying the chip material was also brought to a moisture of 150% as described above. Two batches of panels were likewise produced from the dry material with a binder content of 5% and 10% respectively. A press factor of 7.8 seconds/mm was calculated from the required pressing time. The results of the mechanical-chemical testing are shown in Table 3.

TABLE 1

14C mass balance analysis of a reaction for coupling 14C-HMBA to milled wood lignin (MWL) by means of laccase (reaction) and the corresponding control reaction without laccase (control).

| | % of the 14C-HMBA used | |
|---|---|---|
| | Reaction | Control |
| Solid phase (MWL) | 50.7 | 3.2 |
| Liquid phase (supernatant) | 37.4 | 81.4 |
| Reaction vessel | 7.6 | 5.0 |
| Washings | 3.3 | 9.0 |
| Total | 99.0 | 98.6 |

TABLE 2

Coupling of 14C-HMBA to spruce wood chips by means of laccase under different reaction conditions at 30° C. and pH 5 in 5 mM acetate buffer

| Ratio liquid/solid | HMBA (mg/g) | Laccase (U/g) | Reaction time (h) | Bound 14C-HMBA (%) |
|---|---|---|---|---|
| 20:1 | 6 | 2 | 2 | 47 |
| 2:1 | 6 | 0.2 | 2 | 55 |
| 2:1 | 6 | 0.2 | 4 | 90 |
| 2:1 | 6 | 0.2 | 8 | 97 |
| 2:1 | 6 | 0 | 8 | 3 |

TABLE 3

Physical-chemical properties of the lab panels from Examples 5 and 6 (mean of 10 individual values, apart from for formaldehyde content mean of 2 individual values).

| | Unit | Reference 5% Example 2 | Treated 5% Example 1 | Reference 10% Example 2 | Treated 10% Example 1 |
|---|---|---|---|---|---|
| Binder content | % | 5 | 10 | 5 | 10 |
| Thickness | mm | 14.1 | 14.2 | 14.2 | 14.1 |
| Density | kg/m$^2$ | 649 | 654 | 651 | 639 |
| Thickness swell 2 hours | % | 28.2 | 24.5 | 15.3 | 12.7 |
| Thickness swell 24 hours | % | 32.7 | 27.3 | 18.7 | 14.5 |
| Bending strength | N/mm$^2$ | 7.3 | 10.2 | 9.1 | 12.3 |
| Modulus of elasticity | N/mm$^2$ | 970 | 1240 | 1780 | 1990 |
| Transverse tensile strength | N/mm$^2$ | 0.32 | 0.45 | 0.49 | 0.58 |
| Formaldehyde content to EN 120 based on 6.5% moisture | mg/100 g | 3.8 | 3.0 | 5.8 | 5.2 |

The invention claimed is:

1. Method for producing a lignocellulose-based product from at least (a) one lignocellulose-containing material, (b) a resin-based binder and (c) an organic compound which comprises at least one first and one second functional group, wherein the first functional group is an oxidisable functional group, the second functional group is a group which is capable of reacting with the binder to form a substantially covalent bond, and an aromatic compound is used as the organic compound in which the second functional group is decoupled from the aromate by an aliphatic side chain, wherein the method comprises:

treating the lignocellulose-containing material with the organic compound in the presence of an oxidising agent, wherein the treatment takes place in a medium and under reaction conditions such that the first functional group of the organic compound is oxidised, whereby at least one oxidation product of the organic compound is produced which, with the lignocellulose-containing material, enters a substantially covalent bond, treating the reaction product from lignocellulose-containing material and organic compound, with the binder, wherein the treatment takes place in a medium and under reaction conditions such that the second functional group of the organic compound or a derivative thereof formed in the course of treatment, with the binder, enters a substantially covalent bond and curing the composite material thus produced.

2. The method of according to either claim 1 wherein, the lignocellulose-based product is selected from the group consisting of:

wooden composite material, fibreboard, chipboard, particle board, plywood, oriented strand board (OSB), and moulded composite materials.

3. The method of claim 1, wherein the lignocellulose-containing material is selected from the group consisting of:

plant fibres, wood fibres, wood chips, flakes and wood veneers.

4. The method of any one of claim 1, wherein a binder from the group comprising consisting of:

aminoplasts, phenoplasts, vinyl acetates, isocyanates, epoxy resins and acrylic resins is selected as the resin-containing binder.

5. The method claim 1, wherein urea-formaldehyde resin, melamine-formaldehyde resin, phenol-formaldehyde resin, polyvinyl acetate and/or casein glue is used as the resin-containing binder.

6. The method of claim 1, wherein the binder contains a curing agent and/or curing takes place by pressing the composite material under the action of heat.

7. The method of claim 1, wherein the quantity of binder used is 0.01 to 15% by weight based on the dry weight of the lignocellulose-containing material used.

8. The method of claim 1, wherein an aliphatic or heterocyclic compound with 3 to 15 carbon atoms and/or an aromatic compound with 6 to 20 carbon atoms is used as the organic compound.

9. The method of claim 1, wherein the functional groups of the organic compound independently of each other are an oxygen-containing or a nitrogen-containing group and/or a group containing a multiple bond.

10. The method of claim 1, wherein the first oxidisable functional group is selected from the group consisting of:

hydroxyl, aromatic hydroxyl, hydroxylamino, carbonyl, amine, imine, amide, nitrile, isonitrile, azo, alkene and alkyne groups.

11. The method of claim 1, wherein the first oxidisable group is produced in the course of a chemical reaction under the reaction conditions of the first and/or second method step from a precursor thereof which is selected from the group consisting of:

hydroxyl, aromatic hydroxyl, carbonyl, amine, imine, nitrile, isonitrile, azo, alkene and alkyne groups.

12. The method of claim 1, wherein the second functional group is selected from the group consisting of:

hydroxyl, aromatic hydroxyl, carbonyl, carboxyl, amine, imine, amide, ureide, N-substituted ureide, urea, N-substituted urea, urethane, N-substituted urethane, nitrile, isonitrile, azo, alkene and alkyne groups.

13. The method of claim 1, wherein the second functional group is produced in the course of a chemical reaction under the reaction conditions of the first and/or second method step from a precursor thereof which is selected from the group comprising consisting of:

hydroxyl, aromatic hydroxyl, carbonyl, carboxyl, mine, imine, amide, ureide, N-substituted ureide, urea, N-substituted urea, urethane, N-substituted urethane, nitrile, isonitrile, azo, alkene and alkyne groups.

14. The method of claim 1, wherein a phenolic compound and/or an aromatic amine is used as the organic compound.

15. The method of claim 1, wherein an organic resin former with an aldehyde component is used as the binder.

16. The method of claim 15, wherein urea, phenols, melamine, polyamines, polyamides and/or acetone is used as the organic resin former.

17. The method of claim 15, wherein formaldehyde, benzaldehyde and/or furfuryl alcohol is used as the aldehyde component.

18. The method of claim 1, wherein 4-hydroxy-3-methoxybenzylamine (HMBA) is used as the organic compound.

19. The method of claim 1, wherein the quantity of organic compound is 0.01 to 200 mol % based on the quantity of binder used.

20. The method of claim 1, wherein oxygen and/or hydrogen peroxide is used as the oxidising agent.

21. The method of claim 1, wherein the first functional group is oxidised by the oxidising agent in the presence of a catalyst.

22. The method of claim 21, wherein an enzyme from the group consisting of oxidases and peroxidases is selected as the catalyst.

23. The method of claim 21, wherein oxygen is selected as the oxidising agent and an enzyme from the group comprising consisting of:

oxidases, catecholoxidases (EC 1.10.3.1, EC 1.10.3.4 and EC 1.10.3.5), peroxidases, and bilirubin oxidases (EC 1.3.3.5) is selected as the catalyst.

24. The method of claim 21, wherein laccase is used as the enzyme.

25. The method of claim 21, wherein a peroxidase is used as the enzyme and hydrogen peroxide is used as the oxidising agent.

26. The method of claim 20, wherein the initial concentration of the hydrogen peroxide in the medium is 0.01 to 100 mM.

27. The method of claim 21, wherein the quantity of enzyme used is 0.01 to 1,000 enzyme units per g dry lignocellulose-containing material.

28. The method of claim 1, wherein when treating the lignocellulose-containing material in the presence of the oxidising agent the medium has a temperature of 10 to 120° C., and/or a pH of 2 to 10.

29. The method of claim 1, wherein an aqueous and/or organic solvent is used as the reaction medium.

30. The method of claim 1, wherein the reaction product of lignocellulose-containing material and organic compound, the composite material and/or the lignocellulose-based product is dried in a further method step.

31. The method of claim 1, wherein before treatment of the lignocellulose-containing material in the first method step, the second functional group of the organic compound is converted into a protective group, which is inert under the reaction conditions of the first method step, and before treatment with the binder the protective group is converted back into the functional group in the second method step.

* * * * *

UNITED STATES PATENT AND TRADEMARK OFFICE
CERTIFICATE OF CORRECTION

PATENT NO. : 8,679,388 B2
APPLICATION NO. : 10/571301
DATED : March 25, 2014
INVENTOR(S) : E. Srebotnik, T. Kuncinger and M. Steinwender It is certified that error appears in the above-identified patent and that said Letters Patent is hereby corrected as shown below:

In the Claims:

On page 14, column 12, line 58

Delete – "120°C.,"

*and replace it with*

– "120°C,"

On page 15, column 13, line 4

Delete – "with the binder the protective group"

*and replace it with*

– "with the binder, the protective group"

Signed and Sealed this
Fifteenth Day of July, 2014

Michelle K. Lee
*Deputy Director of the United States Patent and Trademark Office*